US010734815B2

(12) United States Patent
Eda et al.

(10) Patent No.: US 10,734,815 B2
(45) Date of Patent: Aug. 4, 2020

(54) POWER COORDINATION CONTROL SYSTEM, POWER COORDINATION CONTROL METHOD, AND NON-TRANSITORY STORAGE MEDIUM

(71) Applicant: OMRON Corporation, Kyoto (JP)

(72) Inventors: Takayuki Eda, Tatebayashi (JP); Kazuki Kasai, Tokyo (JP); Hiroshi Imai, Nara (JP); Hiromasa Takatsuka, Tokyo (JP); Fumiji Aita, Nara (JP)

(73) Assignee: OMRON Corporation, Kyoto (JP)

( * ) Notice: Subject to any disclaimer, the term of this patent is extended or adjusted under 35 U.S.C. 154(b) by 348 days.

(21) Appl. No.: 15/750,842

(22) PCT Filed: Nov. 17, 2016

(86) PCT No.: PCT/JP2016/084111
§ 371 (c)(1),
(2) Date: Feb. 7, 2018

(87) PCT Pub. No.: WO2017/145460
PCT Pub. Date: Aug. 31, 2017

(65) Prior Publication Data
US 2018/0226804 A1   Aug. 9, 2018

(30) Foreign Application Priority Data
Feb. 25, 2016   (JP) ................... 2016-033945

(51) Int. Cl.
*H02J 3/46* (2006.01)
*H04B 3/54* (2006.01)
(Continued)

(52) U.S. Cl.
CPC ................... *H02J 3/46* (2013.01);
*H02J 3/28* (2013.01); *H02J 3/383* (2013.01);
*H02J 7/35* (2013.01);
(Continued)

(58) Field of Classification Search
CPC ....................................... H02J 3/46
See application file for complete search history.

(56) References Cited

U.S. PATENT DOCUMENTS

2004/0212481 A1   10/2004 Abraham
2009/0040029 A1*   2/2009 Bridges ............... H02J 3/008
340/12.37
(Continued)

FOREIGN PATENT DOCUMENTS

CN   103299335   9/2013
CN   204177891   2/2015
(Continued)

OTHER PUBLICATIONS

"Search Report of Europe Counterpart Application", dated Jun. 7, 2019, p. 1-p. 9.
(Continued)

*Primary Examiner* — Daniel J Cavallari
(74) *Attorney, Agent, or Firm* — JCIPRNET

(57) ABSTRACT

Power coordination control systems (10a-10c) are provided with superimposed signal generation units (11a-11c), transmission units (12a-12c), receiving units (13a-13c) and connection relation estimation units (14a-14c). At the location of a utility consumer A (20), the superimposed signal generation unit (11a) generates a superimposed signal by superimposing a prescribed signal on a voltage supplied from a system (50). The transmission unit (12a) transmits the superimposed signal generated in the superimposed signal generation unit (11a) from the utility consumer A (20) to utility consumers B (30) and C (40). The receiving unit (13b) receives the superimposed signal at the location of the utility consumer B (30). The connection relation estimation units (14a-14c) estimate the connection relation between the utility consumer A (20) and the utility consumer B (30) on
(Continued)

the basis of the receiving status of the superimposed signal and/or the received information received by the receiving units (13a-13c).

20 Claims, 7 Drawing Sheets

(51) Int. Cl.
 *H02J 7/35* (2006.01)
 *H02J 3/28* (2006.01)
 *H02J 3/38* (2006.01)
 *H02J 13/00* (2006.01)

(52) U.S. Cl.
 CPC ............ *H02J 13/0017* (2013.01); *H04B 3/54* (2013.01); *Y02E 40/72* (2013.01); *Y04S 10/12* (2013.01)

(56) References Cited

U.S. PATENT DOCUMENTS

| 2014/0025218 | A1 | 1/2014 | Nishi et al. | |
|---|---|---|---|---|
| 2014/0277813 | A1* | 9/2014 | Powell | H02J 3/1821 700/298 |
| 2014/0278162 | A1* | 9/2014 | Riley, Jr. | G01R 31/088 702/59 |

FOREIGN PATENT DOCUMENTS

| CN | 105072034 | 11/2015 |
|---|---|---|
| JP | 2003-324850 | 11/2003 |
| JP | 2012-157160 | 8/2012 |
| JP | 2012-213256 | 11/2012 |
| JP | 2013-078177 | 4/2013 |
| JP | 2013-187935 | 9/2013 |
| JP | 5576498 | 8/2014 |

OTHER PUBLICATIONS

"International Search Report (Form PCT/ISA/210) of PCT/JP2016/084111," dated Jan. 31, 2017, with English translation thereof, pp. 1-4.

"Written Opinion of the International Searching Authority (Form PCT/ISA/237) of PCT/JP2016/084111," dated Jan. 31, 2017, with English translation thereof, pp. 1-8.

Office Action of China Counterpart Application, with English translation thereof, dated Apr. 1, 2020, pp. 1-22.

* cited by examiner

POWER COORDINATION CONTROL SYSTEM, POWER COORDINATION CONTROL METHOD, AND NON-TRANSITORY STORAGE MEDIUM

CROSS-REFERENCE TO RELATED APPLICATION

This application is a 371 application of the international PCT application serial no. PCT/JP2016/084111, filed on Nov. 17, 2016, which claims the priority benefit of Japan application no. 2016-033945, filed on Feb. 25, 2016. The entirety of each of the abovementioned patent applications is hereby incorporated by reference herein and made a part of this specification.

TECHNICAL FIELD

The present invention relates to a power coordination control system, a power coordination control method, and a non-transitory storage medium.

BACKGROUND ART

In recent years, power generation devices (for example, photovoltaic power generation devices) generating electric power using renewable energy have been used. In Japan, since a surplus electric power purchase system was enacted, electric power generated by photovoltaic power generation devices, wind power generation devices, and the like can be sold to a power company.

However, there are cases in which generated electric power cannot be sold to a power company. For example, there are cases in which the amount of electric power that has been purchased by a power company exceeds a predetermined amount of electric power that can be purchased by the power company (hereinafter, referred to as output curtailment). For this reason, there are cases in which a storage battery capable of temporarily storing electric power that cannot be sold is used by a consumer.

However, in a case in which the amount of electric power generated by the power generation devices is larger than the remaining capacity of a storage battery, there are cases in which the electric power generated by the power generation devices is discarded.

For example, in Patent Literature 1, a power management system is disclosed which predicts a power distribution network on the basis of various kinds of information including the positional information of consumers, the positional information of facilities, and map information and calculates surplus electric power of a predetermined district using the predicted power distribution network.

CITATION LIST

Patent Literature

[Patent Literature 1]
Japanese Patent Publication No. 5576498

SUMMARY OF INVENTION

Technical Problem

However, the conventional power management system described above has the following problems.

In the power management system disclosed in the patent publication described above, a consumer in which surplus electric power is generated may not be able to find another consumer which belongs to the same power distribution network and has a small power transmission loss therebetween.

Particularly, since information relating to the power distribution network is handled as confidential information, it is difficult to ascertain whether or not power distribution line systems of consumers are the same.

An object of the present invention is to provide a power coordination control system, a power coordination control method, and a non-transitory storage medium for storing a power coordination control program capable of efficiently circulating the surplus electric power by searching for consumers connected to the same power distribution network among a plurality of consumers.

Solution to Problem

A power coordination control system according to one embodiment of the first invention is a power coordination control system used for retrieving a connection relation between a first consumer and a second consumer connected to a first power distribution line system and includes a superimposition signal generating unit, a transmission unit, a receiving unit, and a connection relation estimating unit. The superimposition signal generating unit generates a superimposition signal acquired by superimposing a predetermined signal on a voltage supplied from the first power distribution line system in the first consumer. The transmission unit transmits the superimposition signal generated by the superimposition signal generating unit from the first consumer to the second consumer. The receiving unit receives the superimposition signal in the second consumer. The connection relation estimating unit estimates a connection relation between the first consumer and the second consumer on the basis of at least one of a receiving status of the superimposition signal and receiving information received by the receiving unit.

Here, a superimposition signal acquired by superimposing a predetermined signal on a system voltage is generated by the first consumer and is transmitted to the second consumer, and a connection relation between the first consumer and the second consumer is estimated on the basis of at least one of a receiving status of the superimposition signal in the second consumer and receiving information received by the receiving unit.

Here, the connection relation between the first consumer and the second consumer includes relations such as whether or not they are connected to the same power distribution line system and whether a power transmission distance is long or short in accordance with a connection to the same power distribution line system.

In addition, for example, predetermined values for the signal intensities of the superimposition signals transmitted and/or received between the first consumer and the second consumer are preferably known in the first and second consumers. Accordingly, when the receiving status of the superimposition signal is detected by the connection relation estimating unit, the connection relation between the first consumer and the second consumer can be estimated by comparing the predetermined value of the corresponding signal intensity with the signal intensity of the received superimposition signal and acquiring an attenuation rate.

In a consumer group configured by a plurality of consumers including the first and second consumers, the first consumer and the second consumer do not represent specific consumers but mean arbitrary consumers in the consumer group including the plurality of consumers.

In addition, the first consumer and the second consumer are not limited to being connected to the same power distribution line system and include consumers connected to different power distribution line systems. Furthermore, each of the first consumer and the second consumer preferably includes a transmission unit and a receiving unit.

Accordingly, for example, it can be estimated whether or not the second consumer is connected to the same power distribution line system as that of the first consumer and whether or not a power transmission distance is short in accordance with the receiving status of the superimposition signal in the second consumer.

Here, for example, at least one of the first consumer and the second consumer is assumed to include a power supply device that supplies electric power and a load that consumes electric power. In such a case, by setting a consumer having the shortest power transmission distance from a consumer in which surplus electric power is generated among a plurality of consumers that have received the superimposition signals as a supply destination of the surplus electric power, the surplus electric power can be used by the consumer having a small power transmission loss.

As a result, a consumer connected to the same power distribution network is retrieved from among the plurality of consumers, and surplus electric power can be mutually circulated efficiently.

The power coordination control system according to the second invention is the power coordination control system according to the first invention, in which the connection relation estimating unit estimates that the first consumer and the second consumer are connected to the first power distribution line system in a case in which the superimposition signal is received.

Here, based on whether or not the superimposition signal has been received by the second consumer, it is estimated whether or not the second consumer is connected to the same power distribution line system as that of the first consumer.

Here, in a case in which the superimposition signal transmitted from the first consumer can be received by the second consumer, it is estimated that the first consumer and the second consumer have a relationship in which there is a small power transmission loss, in other words, a high likelihood of being connected to the same power distribution line system is estimated.

In this way, in a case in which the superimposition signal transmitted from the first consumer can be received by the second consumer, it can be estimated that the first consumer and the second consumer are connected to the same power distribution line system.

The power coordination control system according to the third invention is the power coordination control system according to the second invention, in which the connection relation estimating unit estimates a power transmission distance between the first consumer and the second consumer in accordance with at least one of an attenuation rate of a signal intensity of the superimposition signal compared to a predetermined signal intensity, a delay time of the signal, and an signal/noise ratio (S/N ratio).

Here, in a case in which the superimposition signal is received by the second consumer, a distance (power transmission distance) between the first consumer and the second consumer on a power distribution line system is estimated in accordance with at least one of the attenuation rate of the signal intensity of the superimposition signal calculated by comparing the signal intensity of the received superimposition signal with the signal intensity of the superimposition signal at the time of transmission, the delay time of the signal, and the S/N ratio.

Here, for example, in a case in which the superimposition signal transmitted from the first consumer is received with a signal intensity of 80% or more by the second consumer, a relation having a small power transmission loss, in other words, a high likelihood of there being a short power transmission distance in the same power distribution line system is estimated.

On the other hand, for example, in a case in which the superimposition signal transmitted from the first consumer is received with a signal intensity of 30% or less by the second consumer, between the first consumer and the second consumer, a relation having a large power transmission loss, in other words, a high likelihood of there being a long power transmission distance even in the same power distribution line system is estimated.

Similarly, also in a case in which the delay time until the signal is received or the S/N ratio is used, a relation with respect to the degree of the distance between the first consumer and the second consumer on the same power distribution line system can be estimated.

A power coordination control system according to the fourth invention is the power coordination control system according to any one of the first to third inventions, in which the connection relation estimating unit estimates that the second consumer is connected to a second power distribution line system other than the first power distribution line system in a case in which superimposition signal is not received.

Here, it is estimated whether or not the second consumer and the first consumer are connected to the same power distribution line system based on whether the superimposition signal is received by the second consumer.

Here, in a case in which the superimposition signal transmitted from the first consumer cannot be received by the second consumer, a relation of being incapable of transmitting/receiving signals, in other words, in which there is a high likelihood of being connected to a different power distribution line system is estimated.

In this way, in a case in which the superimposition signal transmitted from the first consumer cannot be received by the second consumer, it can be estimated that the first consumer and the second consumer are connected to different power distribution line systems.

A power coordination control system according to the fifth invention is the power coordination control system according to any one of the first to fourth inventions, in which the superimposition signal generating unit generates the superimposition signal by superimposing a predetermined high frequency component on a voltage supplied from the first power distribution line system.

Here, a predetermined high frequency component is used as a signal superimposed on a voltage.

In this way, by superimposing a high frequency component on a normal voltage, a superimposition signal can be easily generated.

A power coordination control system according to the sixth invention is the power coordination control system according to any one of the first to fifth inventions, in which the superimposition signal generating unit generates a superimposition signal which has at least one of positional information and identification information of the first consumer.

Here, when the superimposition signal is generated by the first consumer, at least one of the positional information and the identification information of the first consumer is attached.

Accordingly, the second consumer that has received the superimposition signal can recognize a consumer from which the superimposition signal has been received.

A power coordination control system according to the seventh invention is the power coordination control system according to any one of the first to sixth inventions and further includes a matching unit that determines a supply destination of surplus electric power generated in the first consumer or the second consumer on the basis of a result of the estimation performed by the connection relation estimating unit in a case in which the superimposition signals transmitted from a plurality of the first consumers are received.

Here, for example, in a case in which the superimposition signal transmitted from the first consumer is received by the second consumer, the second consumer that has received the superimposition signal is matched with the first consumer.

As a result, for example, in a case in which surplus electric power is generated in the first consumer, the surplus electric power can be efficiently used for the second consumer to which the electric power can be supplied without a large power transmission loss.

A power coordination control system according to the eighth invention is the power coordination control system according to any one of the first to seventh inventions, in which the matching unit performs supplying of surplus electric power by combining the first consumer and the second consumer, both of which have low attenuation rates of the signal intensities of the superimposition signals, short delay times of the signals, or high S/N ratios according to a result of the estimation performed by the connection relation estimating unit.

Here, for example, in a case in which a plurality of superimposition signals transmitted from a plurality of first consumers are received by the second consumer, the first consumer and the second consumer that can circulate electric power the most efficiently are matched on the basis of the magnitude of the attenuation rate of the signal intensity, the delay time of the signal, the S/N ratio or the like, as described above.

As a result, for example, in a case in which the surplus electric power is generated in the first consumer, the second consumer having a smallest power transmission loss is matched with the first consumer, whereby the surplus electric power can be efficiently used.

A power coordination control method according to the ninth invention is a power coordination control method used for retrieving a connection relation between a first consumer and a second consumer connected to a first power distribution line system and includes a superimposition signal generating step, a transmission step, a receiving step, and a connection relation estimating step. In the superimposition signal generating step, a superimposition signal acquired by superimposing a predetermined signal on a voltage supplied from the first power distribution line system is generated in the first consumer. In the transmission step, the superimposition signal generated in the superimposition signal generating step is transmitted from the first consumer to the second consumer. In the receiving step, the superimposition signal is received in the second consumer. In the connection relation estimating step, a connection relation between the first consumer and the second consumer is estimated on the basis of at least one of a status of the superimposition signal received in the receiving step and receiving information received in the receiving step.

Here, a superimposition signal acquired by superimposing a predetermined signal on a system voltage is generated by the first consumer and is transmitted to the second consumer, and a connection relation between the first consumer and the second consumer is estimated on the basis of at least one of a receiving status of the superimposition signal in the second consumer and receiving information received in the receiving step.

Here, the connection relation between the first consumer and the second consumer includes relations such as whether or not being connected to the same power distribution line system and whether a power transmission distance is long or short in accordance with a connection to the same power distribution line system.

In addition, for example, the signal intensities of the superimposition signals transmitted and/or received between the first consumer and the second consumer are preferably known in the first and second consumers as predetermined values. Accordingly, when the receiving status of the superimposition signal is detected by the connection relation estimating step, the connection relation between the first consumer and the second consumer can be estimated by comparing the corresponding signal intensity of the predetermined value with the signal intensity of the received superimposition signal and acquiring an attenuation rate.

In a consumer group configured by a plurality of consumers including the first and second consumers, the first consumer and the second consumer do not represent specific consumers but mean arbitrary consumers in the consumer group including the plurality of consumers.

In addition, the first consumer and the second consumer are not limited to being connected to the same power distribution line system and include consumers connected to different power distribution line systems. Furthermore, each of the first consumer and the second consumer preferably can perform the transmission step and the receiving step.

Accordingly, for example, it can be estimated whether or not the second consumer is connected to the same power distribution line system as that of the first consumer and whether or not a power transmission distance is short in accordance with the receiving status of the superimposition signal in the second consumer.

Here, for example, at least one of the first consumer and the second consumer is assumed to include a power supply device supplying electric power and a load consuming electric power. In such a case, by setting a consumer having the shortest power transmission distance from a consumer in which the surplus electric power is generated among a plurality of consumers that have received the superimposition signals as a supply destination of the surplus electric power, the surplus electric power can be used by a consumer having a small power transmission loss.

As a result, a consumer connected to the same power distribution network is retrieved from among the plurality of consumers, and surplus electric power can be mutually circulated efficiently.

A non-transitory storage medium for storing a power coordination control program according to the tenth invention is a non-transitory storage medium for storing a power coordination control program used for retrieving a connection relation between a first consumer and a second consumer connected to a first power distribution line system and causes a computer to execute a power coordination control method including a superimposition signal generating step, a transmission step, a receiving step, and a connection relation estimating step. In the superimposition signal generating step, a superimposition signal acquired by superimposing a predetermined signal on a voltage supplied from the first power distribution line system is generated in the first consumer. In the transmission step, the superimposition signal generated in the superimposition signal generating step is transmitted from the first consumer to the second consumer. In the receiving step, the superimposition signal is received in the second consumer. In the connection relation estimating step, a connection relation between the first consumer and the second consumer is estimated on the basis of at least one of a status of the superimposition signal received in the receiving step and receiving information received in the receiving step.

Here, a superimposition signal acquired by superimposing a predetermined signal on a system voltage is generated by the first consumer and is transmitted to the second consumer, and a connection relation between the first consumer and the second consumer is estimated on the basis of at least one of a receiving status of the superimposition signal in the second consumer and receiving information received in the receiving step.

Here, the connection relation between the first consumer and the second consumer includes relations such as whether or not being connected to the same power distribution line system and whether a power transmission distance is long or short in accordance with a connection to the same power distribution line system.

In addition, for example, the signal intensities of the superimposition signals transmitted/received between the first consumer and the second consumer are preferably known in the first and second consumers as predetermined values. Accordingly, when the receiving status of the superimposition signal is detected by the connection relation estimating step, the connection relation between the first consumer and the second consumer can be estimated by comparing the corresponding signal intensity of the predetermined value with the signal intensity of the received superimposition signal and acquiring an attenuation rate.

Furthermore, in a consumer group configured by a plurality of consumers including the first and second consumers, the first consumer and the second consumer do not represent specific consumers but mean arbitrary consumers in the consumer group including the plurality of consumers.

In addition, the first consumer and the second consumer are not limited to being connected to the same power distribution line system and include consumers connected to different power distribution line systems. Furthermore, each of the first consumer and the second consumer preferably can perform the transmission step and the receiving step.

Accordingly, for example, it can be estimated whether or not the second consumer is connected to the same power distribution line system as that of the first consumer and whether or not a power transmission distance is short in accordance with the receiving status of the superimposition signal in the second consumer.

Here, for example, at least one of the first consumer and the second consumer is assumed to include a power supply device supplying electric power and a load consuming electric power. In such a case, by setting a consumer having a shortest power transmission distance from a consumer in which surplus electric power is generated among a plurality of consumers that have received the superimposition signals as a supply destination of the surplus electric power, the surplus electric power can be used by a consumer having a small power transmission loss.

As a result, a consumer connected to the same power distribution network is retrieved from among the plurality of consumers, and surplus electric power can be mutually circulated efficiently.

Advantageous Effects of Invention

According to a power coordination control system of the present invention, surplus electric power can be efficiently circulated by searching for consumers connected to the same power distribution network among a plurality of consumers.

DESCRIPTION OF EMBODIMENTS

Figure 1:
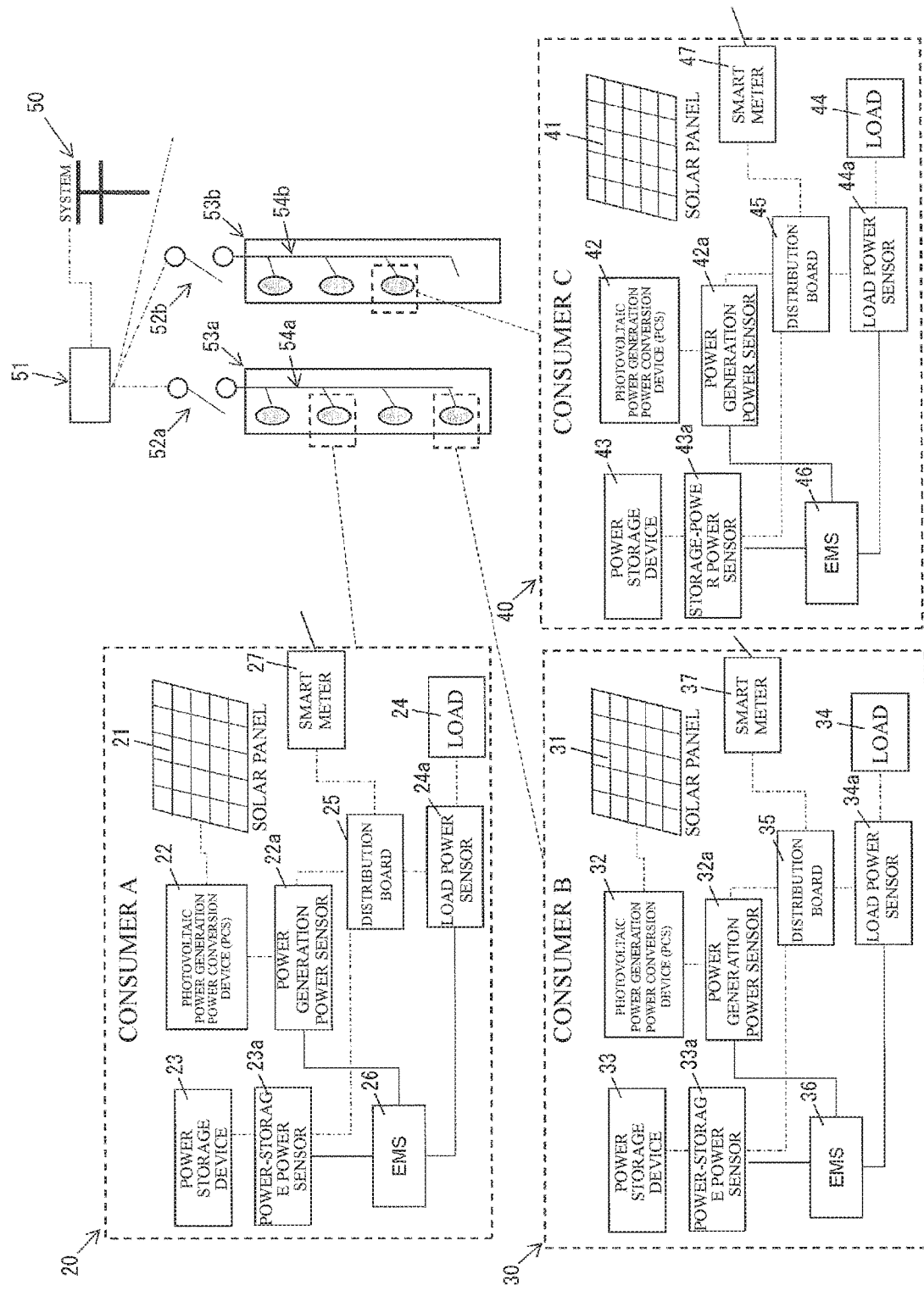
FIG. 1 is a block diagram illustrating connection relations between a plurality of consumers and a power distribution line system configuring a power coordination control system according to one embodiment of the present invention.

Power coordination control systems 10a to 10c according to embodiments of the present invention will be described with reference to FIGS. 1 to 7.

Here, a consumer A20 (first consumer) appearing in the following description means a consumer that owns a power generation device (solar panel 21) and a storage battery (power storage device 23) and has surplus electric power generated in a predetermined time period. In addition, a consumer B30 (second consumer) and a consumer C40 mean consumers that own power generating devices (solar panels 31 and 41) and storage batteries (power storage devices 33 and 43) and are predicted to have electric power deficiencies and demand occurring in predetermined time periods. In addition, these consumers A20, B30, and C40 can switch between a side on which the surplus electric power is generated and a side on which the electric power is required, and the switching may be performed at predetermined time intervals.

Here, a consumer is, for example, an individual, a corporation, an organization, or the like having a contract with a power company and using electric power supplied from the power company through a system 50 (see FIG. 1) and, for example, includes an ordinary home (a detached house or an apartment), a company (an office, a factory, a facility, or the like), a local government, a government organization, and the like. In addition, a consumer includes a consumer providing electric power through in-house power generation and a consumer realizing a zero energy building (ZEB).

In the following embodiments, for the convenience of description, a consumer A20 on a side generating a superimposition signal to be described later and consumers B30 and C40 on a side receiving this superimposition signal will be described as an example. However, in the present invention, the combination of the consumer A20 and the consumers B30, and C40 is not limited to a combination of one consumer-to-two consumers, and there may be a plurality of consumers, that is, three or more consumers to which superimposition signals are transmitted from one consumer A20.

In the following embodiments, a system 50 (see FIG. 1) means a power system supplying electric power supplied from a power company to each consumer.

In addition, in the following embodiments, each of smart meters 27, 37, and 47 (see FIG. 1) respectively means a measuring device that is installed in each consumer and is used for measuring a power generation amount, a power accumulation amount, and a power consumption amount, and for transmitting results of the measurements to a power company or the like using a communication function. By configuring the smart meters 27, 37, 47, the power company can accurately ascertain the power status of each of the consumers A20, B30, and C40 in real time and can achieve a meter reading operation automatically performed for each of predetermined periods.

Furthermore, in the following embodiments, for example, in a case in which a consumer is an ordinary home, loads 24, 34, and 44 (see FIG. 1) mean power consumption bodies such as an air conditioner, a refrigerator, a microwave oven, a IH (Indirect Heating) cooking heater, a television set, and the like. In addition, for example, in a case in which a consumer is a company (a factory or the like), the loads mean power consumption bodies such as various facilities, air conditioning equipment, and the like installed in a factory.

In addition, in the following embodiments, each of energy management systems 26, 36, and 46 (EMS; see FIG. 1) means a system that is installed in each consumer and is installed for reducing the amount of power consumption of each consumer.

Embodiment 1

The power coordination control systems 10a to 10c according to this embodiment are systems that circulate surplus electric power by estimating connection relations between a plurality of consumers owning a power supply device and a power storage device. More specifically, the power coordination control systems 10a to 10c, as illustrated in FIG. 1, estimate connection relations between a consumer A20 (first consumer), a consumer B30 (second consumer), and a consumer C40 (second consumer) and circulate surplus power between the consumer A20 and the consumer B30.

As illustrated in FIG. 1, solid lines represented inside the consumers A20, B30, and C40 represent the flows of information such as data, and dashed lines represent the flows of electricity.

The configurations of the power coordination control systems 10a to 10c according to this embodiment will be described in a later stage in detail.

(Consumer A)

In this embodiment, the consumer A20, as illustrated in FIG. 1, is connected to the system 50 through a substation 51 and a switching unit 52a. The consumer A20 belongs to a consumer group 53a that is the same as that of the consumer B30 to be described later.

Electric power is supplied to the consumers A20, B30, and the like belonging to the consumer group 53a from the system 50 through a common power distribution line system 54a. Then, in a case in which surplus electric power is generated in each of the consumers A20, B30, and the like belonging to the consumer group 53a, power is mutually circulated through the power distribution line system 54a.

The consumer A20 generates a superimposition signal acquired by superimposing a predetermined high frequency component on a voltage supplied from the system 50 by using the superimposition signal generating unit 11a disposed in a smart meter 27 to be described later. Then, the consumer A20 transmits the generated superimposition signal to the other consumers B30 and C40 through a transmission unit 12a.

As illustrated in FIG. 1, the consumer A20 includes: a solar panel (power generation device) 21; a photovoltaic power generation power conversion device (PCS) 22; a power generation power sensor 22a; a power storage device (storage battery) 23; a power-storage power sensor 23a; a load 24; a load power sensor 24a; a distribution board 25; an energy management system (EMS) 26; and a smart meter 27.

The solar panel (power generation device) 21 is an device that generates electricity using a photo electromotive force effect using light energy of sunlight and is installed on a roof or the like of the consumer A20. The amount of power generation in the solar panel 21 can be predicted on the basis of information relating to hours of sunlight of the weather forecast.

The photovoltaic power generation power conversion device (power conditioning system (PCS)) 22, as illustrated in FIG. 1, is connected to the solar panel 21 and converts a DC current generated in the solar panel 21 into an AC current.

The power generation power sensor 22a, as illustrated in FIG. 1, is connected to the photovoltaic power generation power conversion device 22 and measures the amount of power generated by the solar panel 21. Then, the power generation power sensor 22a transmits a result of the measurement (the amount of generated power) to the EMS 26.

The power storage device (storage battery) 23 is disposed for temporarily storing surplus electric power that has not been used by the load 24 from electric power generated by the solar panel 21. In this way, by storing remaining electric power in the power storage device 23 also in a case in which the amount of consumed power of the load 24 is small in a time period of a day in which electric power is generated by the solar panel 21, the wastefulness of discarding the generated electric power can be avoided.

The power-storage power sensor 23a, as illustrated in FIG. 1, is connected to the power storage device 23 and measures the amount of electric power stored by the power storage device 23. Then, the power-storage power sensor 23a transmits a result of the measurement (the amount of stored electric power) to the EMS 26.

The load 24, as described above, is a power consuming body such as an electric appliance such as an air conditioner or a refrigerator in an ordinary home or facilities or air conditioning equipment in a factory or the like and consumes electric power supplied from the system 50, electric power generated by the solar panel 21, and electric power stored by the power storage device 23.

The load power sensor 24a, as illustrated in FIG. 1, is connected to the load 24 and measures the amount of electric power consumed by the load 24. Then, the load power sensor 24a transmits a result of the measurement (the amount of consumed electric power) to the EMS 26.

The distribution board 25, as illustrated in FIG. 1, is connected to the power generation power sensor 22a, the power-storage power sensor 23a, the load power sensor 24a, and the smart meter 27. The distribution board 25 supplies the electric power generated by the solar panel 21 and the electric power stored by the power storage device 23 to the load 24. In addition, the distribution board 25 supplies surplus electric power generated in accordance with a time period to the system 50 through the smart meter 27. In this way, the consumer A20 can sell the surplus electric power to a power company.

The energy management system (EMS) 26 is an energy management system disposed for reducing the amount of electric power consumed by the consumer A20 as described above and, as illustrated in FIG. 1, is connected to the sensors 22a, 23a, and 24a. In addition, the EMS 26 efficiently supplies the electric power generated by the solar panel 21 and the amount of power stored in the power storage device 23 to the load 24 by using detection results received from the sensors 22a, 23a, and 24a. In this way, the consumption amount of electric power supplied from the system 50 is reduced, and the power costs of the consumer A20 can be effectively reduced.

The smart meter 27, as described above, measures the amount of electric power generated by the solar panel 21 owned by the consumer A20, the amount of stored power of the power storage device 23, and the amount of power consumption of the load 24. The smart meter 27, as illustrated in FIG. 1, is connected to the sensors 22a, 23a, and 24a through the distribution board 25. In addition, the smart meter 27 has a communication function (a transmission unit 12a and a receiving unit 13a (see FIG. 2)). In this way, the smart meter 27 transmits information relating to the amount of generated power, the amount of stored power, and the amount of consumed power of the consumer A20 to the power company.

In addition, in this embodiment, the smart meter 27 includes the power coordination control system 10a. The configuration of the power coordination control system 10a will be described in a later stage in detail.

In this embodiment, the consumer A20 will be described as a side that can supply surplus power to the outside in a predetermined time period. For this reason, in the consumer A20, currently or in a predetermined time period in the future, a sum of the amount of generated power using the solar panel 21 and the amount of stored power in the power storage device 23 is assumed to be larger than the amount of consumed power of the load 24.

(Consumer B)

In this embodiment, the consumer B30, as illustrated in FIG. 1, similar to the consumer A20, is connected to the system 50 through a substation 51 and a switching unit 52a. The consumer B30, as described above, belongs to the consumer group 53a that is the same as that of the consumer A20.

The consumer B30, as described above, receives the superimposition signal generated by the superimposition signal generating unit 11b disposed inside the smart meter 27 of the consumer A20 using the receiving unit 13b (see FIG. 2) through the transmission unit 12a of the consumer A20. Then, the consumer B30 estimates a connection relation with the consumer A20 on the basis of the receiving status of the superimposition signal (for example, whether or not the superimposition signal has been received, the signal intensity of the received superimposition signal, and the like) using a connection relation estimating unit 14b.

Here, the connection relation with the consumer A20 that is estimated by the consumer B30, for example, includes relations such as whether or not belonging to the same power distribution line system 54a and whether a distance in the power distribution line is long or short in the case of belonging to the same power distribution line system 54a.

In this embodiment, as illustrated in FIG. 1, the consumer B30 in common with the consumer A20 is connected to the power distribution line system 54a. For this reason, the signal intensity of the superimposition signal transmitted from the consumer A20 is estimated to have a low attenuation rate when the superimposition signal is received by the consumer B30.

The consumer B30, as illustrated in FIG. 1, includes: a solar panel (power generation device) 31; a photovoltaic power generation power conversion device (PCS) 32; a power generation power sensor 32a; a power storage device (storage battery) 33; a power-storage power sensor 33a; a load 34; a load power sensor 34a; a distribution board 35; an energy management system (EMS) 36; and a smart meter 37.

The solar panel (power generation device) 31 is an device that generates electricity using a photo electromotive force effect using light energy of sunlight and is installed on a roof or the like of the consumer B30. The amount of power generation in the solar panel 31 can be predicted on the basis of information relating to hours of sunlight of the weather forecast.

The photovoltaic power generation power conversion device (power conditioning system (PCS)) 32, as illustrated in FIG. 1, is connected to the solar panel 31 and converts a DC current generated in the solar panel 31 into an AC current.

The power generation power sensor 32a, as illustrated in FIG. 1, is connected to the photovoltaic power generation power conversion device 32 and measures the amount of power generated by the solar panel 31. Then, the power generation power sensor 32a transmits a result of the measurement (the amount of generated power) to the EMS 36.

The power storage device (storage battery) 33 is disposed for temporarily storing surplus electric power that has not been used by the load 34 among electric power generated by the solar panel 31. In this way, even in a case in which the amount of consumed power of the load 34 is small in a time period of a day time in which electric power is generated by the solar panel 31, remaining electric power is stored in the power storage device 33 and wastefulness of disposing the generated electric power can be avoided.

The power-storage power sensor 33a, as illustrated in FIG. 1, is connected to the power storage device 33 and measures the amount of electric power stored by the power storage device 33. Then, the power-storage power sensor 33a transmits a result of the measurement (the amount of stored electric power) to the EMS 36.

The load 34, as described above, is a power consumption bodies such as an electric appliance such as an air conditioner or a refrigerator in an ordinary home or facilities or air conditioning equipment in a factory or the like and consumes electric power supplied from the system 50, electric power generated by the solar panel 31, and electric power stored by the power storage device 33.

The load power sensor 34a, as illustrated in FIG. 1, is connected to the load 34 and measures the amount of electric power consumed by the load 34. Then, the load power sensor 34a transmits a result of the measurement (the amount of consumed electric power) to the EMS 36.

The distribution board 35, as illustrated in FIG. 1, is connected to the power generation power sensor 32a, the power-storage power sensor 33a, the load power sensor 34a, and the smart meter 37. The distribution board 35 supplies the electric power generated by the solar panel 31 and the electric power stored by the power storage device 33 to the load 34. In addition, the distribution board 35 supplies surplus electric power generated in accordance with a time period to the system 50 through the smart meter 37. In this way, the consumer B30 can sell the surplus electric power to a power company.

The energy management system (EMS) 36 is an energy management system disposed for reducing the amount of electric power consumed by the consumer B30 as described above and, as illustrated in FIG. 1, is connected to the sensors 32a, 33a, and 34a. In addition, the EMS 36 efficiently supplies the electric power generated by the solar panel 31 and the amount of power stored in the power storage device 33 to the load 34 by using detection results received from the sensors 32a, 33a, and 34a. In this way, the consumption amount of electric power supplied from the system 50 is suppressed, and the power cost of the consumer B30 can be effectively reduced.

The smart meter 37, as described above, measures the amount of electric power generated by the solar panel 31 owned by the consumer B30, the amount of stored power of the power storage device 33, and the amount of power consumption of the load 34. The smart meter 37, as illustrated in FIG. 1, is connected to the sensors 32a, 33a, and 34a through the distribution board 35. In addition, the smart meter 37 has a communication function (a transmission unit 12b and a receiving unit 13b (see FIG. 2)). In this way, the smart meter 37 transmits information relating to the amount of generated power, the amount of stored power, and the amount of consumed power of the consumer B30 to the power company.

In addition, in this embodiment, the smart meter 37 includes the power coordination control system 10b. The configuration of the power coordination control system 10b will be described in a later stage in detail.

In this embodiment, the consumer B30 will be described as a side that requires power supply from the outside in a predetermined time period. For this reason, in the consumer B30, currently or in a predetermined time period in the future, the amount of consumed power of the load 34 is assumed to be larger than a sum of the amount of generated power using the solar panel 31 and the amount of stored power in the power storage device 33.

(Consumer C)

In this embodiment, the consumer C40, as illustrated in FIG. 1, is connected to the system 50 through a substation 51 and a switching unit 52b. The consumer C40, as described above, belongs to a consumer group 53b that is different from that of the consumers A20 and B30.

The consumer C40, as described above, receives the superimposition signal generated by the superimposition signal generating unit 11b disposed inside the smart meter 27 of the consumer A20 using the receiving unit 13c (see FIG. 2) through the transmission unit 12a of the consumer A20. Then, the consumer C40 estimates a connection relation with the consumer A20 on the basis of the receiving status of the superimposition signal (for example, whether or not the superimposition signal has been received, the signal intensity of the received superimposition signal, and the like) using a connection relation estimating unit 14c.

Here, the connection relation with the consumer A20 that is estimated by the consumer C40, for example, includes relations such as whether or not belonging to the same power distribution line system and whether a distance in the power distribution line is long or short in the case of belonging to the same power distribution line system.

In this embodiment, as illustrated in FIG. 1, the consumer C40 is connected to a power distribution line system 54b that is different from that of the consumer A20. For this reason, the signal intensity of the superimposition signal transmitted from the consumer A20 is estimated to have a high attenuation rate when the superimposition signal is received by the consumer C40, and it is estimated to be difficult to receive the superimposition signal.

The consumer C40, as illustrated in FIG. 1, includes: a solar panel (power generation device) 41; a photovoltaic power generation power conversion device (PCS) 42; a power generation power sensor 42a; a power storage device (storage battery) 43; a power-storage power sensor 43a; a load 44; a load power sensor 44a; a distribution board 45; an energy management system (EMS) 46; and a smart meter 47.

The solar panel 41, the photovoltaic power generation power conversion device 42; the power generation power sensor 42a, the power storage device 43; the power-storage power sensor 43a, the load 44, the load power sensor 44a, the distribution board 45, and the EMS 46 have functions similar to those owned by the consumers A20 and B30 described above. Thus, here, detailed description thereof will not be presented.

The smart meter 47, as described above, measures the amount of electric power generated by the solar panel 41 owned by the consumer C40, the amount of stored power of the power storage device 43, and the amount of power consumption of the load 44. The smart meter 47, as illustrated in FIG. 1, is connected to the sensors 42a, 43a, and 44a through the distribution board 45. In addition, the smart meter 47 has a communication function (a transmission unit 12c and a receiving unit 13c (see FIG. 2)). In this way, the smart meter 47 transmits information relating to the amount of generated power, the amount of stored power, and the amount of consumed power of the consumer C40 to the power company.

In addition, in this embodiment, the smart meter 47 includes the power coordination control system 10c. The configuration of the power coordination control system 10c will be described in a later stage in detail.

(Configuration of Power Coordination Control Systems 10a to 10c)

Figure 2:
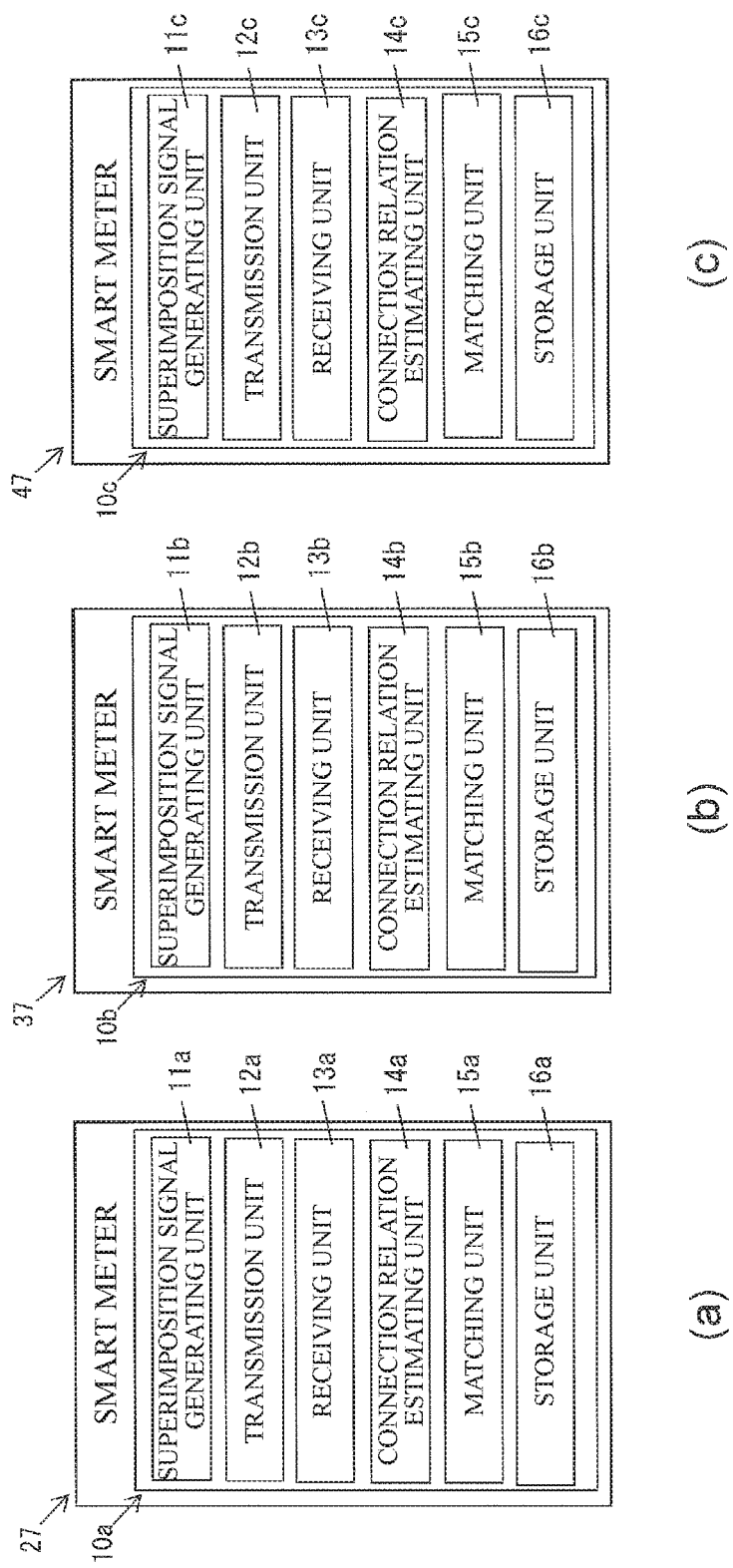
FIG. 2 including parts (a), (b), and (c), which are block diagrams illustrating control blocks formed inside a smart meter of each consumer configuring the power coordination control system illustrated in FIG. 1.

The power coordination control systems 10a to 10c according to this embodiment are systems for estimating mutual connection relations of the consumer groups 53a and 53b including a plurality of consumers and for circulating surplus electric power generated by the consumers A20 to C40 to consumers that can efficiently use the surplus electric power. The power coordination control systems 10a to 10c, as illustrated in FIG. 2, respectively include: superimposition signal generating units 11a to 11c; transmission units 12a to 12c; receiving units 13a to 13c; connection relation estimating units 14a to 14c; matching units 15a to 15c; and storage units 16a to 16c.

The configurations of the power coordination control systems 10a, 10b, and 10c disposed inside the smart meters 27, 37, and 47 owned by the consumers A20 to C40 have the same function. Thus, in the following description, for the convenience of description, the configuration of the power coordination control system 10a disposed inside the smart meter 27 owned by the consumer A20 will be described as an example. Thus, detailed description of the configurations of the other power coordination control systems 10b and 10c will not be presented, and the configurations thereof are assumed to be similar to that of the power coordination control system 10a.

The superimposition signal generating unit 11a generates a superimposition signal used for estimating connection relations between the consumer A20 and the other consumers B30 and C40. The superimposition signal is generated by superimposing a predetermined high frequency component (see FIG. 4) on a voltage supplied from the system 50.

In this embodiment, the superimposition signal is generated by the superimposition signal generating unit 11a disposed inside the smart meter 27 owned by the consumer A20.

The transmission unit 12a transmits a superimposition signal generated by the superimposition signal generating unit 11a to the receiving units 13b and 13c of the other consumers.

In this embodiment, the superimposition signal is transmitted from the transmission unit 12a disposed inside the smart meter 27 owned by the consumer A20 to the other consumers B30 and C40.

The receiving unit 13a receives a superimposition signal transmitted from the transmission unit 12b of the other consumer B30.

Figure 5:
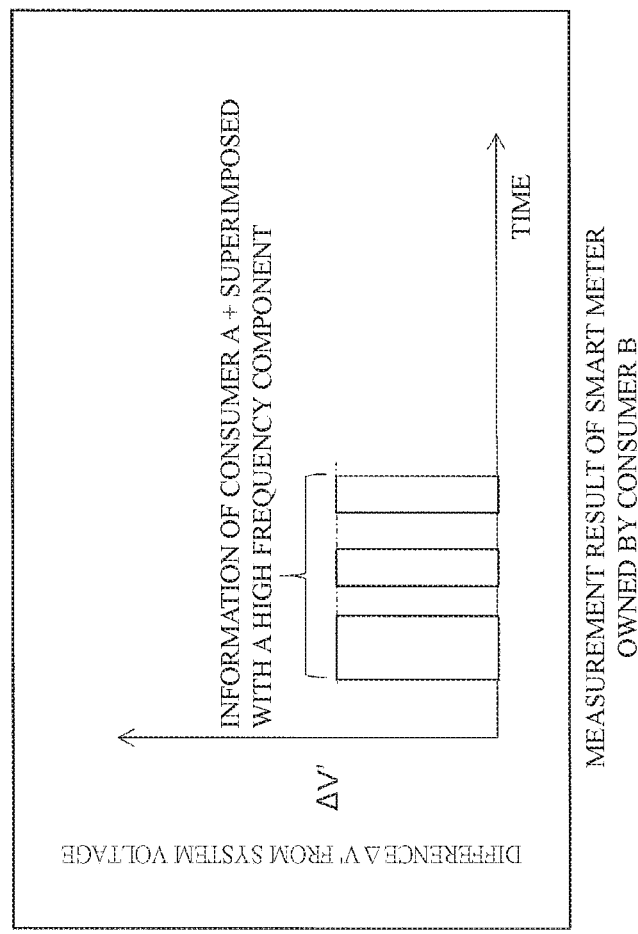
FIG. 5 is a graph illustrating changes in the signal intensity of a superimposition signal that is transmitted from the consumer A illustrated in FIG. 1 and is received by a consumer B connected to the same distribution line system.

In addition, in this embodiment, the superimposition signal transmitted from the consumer A20 is received by the receiving unit 13b of the consumer B30 connected to the same power distribution line system 54a (see FIG. 5).

The connection relation estimating unit 14a estimates a connection relation with a consumer that has transmitted the superimposition signal in accordance with the receiving status of the superimposition signal received by the receiving unit 13a.

For example, in this embodiment, the superimposition signal transmitted from the consumer A20 can be received by the receiving unit 13b of the consumer B30. For this reason, the consumer A20 and the consumer B30 are estimated to be connected to the same power distribution line system 54a and to have a connection relation having a low power transmission loss.

Figure 6:
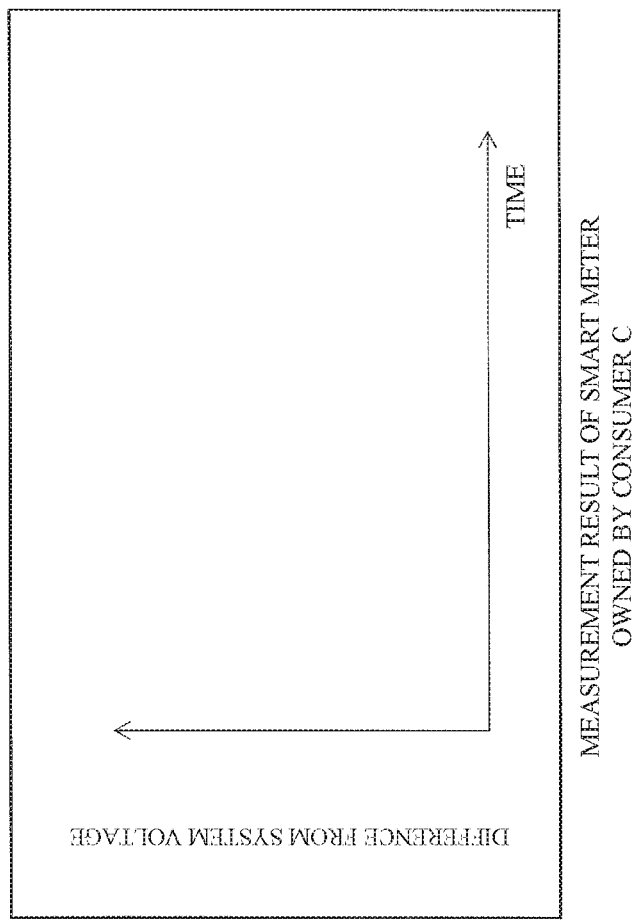
FIG. 6 is a graph illustrating a superimposition signal that is transmitted from the consumer illustrated in FIG. 1 and cannot be received by a consumer C connected to another distribution line system.

On the other hand, the superimposition signal transmitted from the consumer A20 cannot be received by the receiving unit 13c of the consumer C40 (see FIG. 6). For this reason, the consumer A20 and the consumer C40 are estimated to be respectively connected to different power distribution line systems 54a and 54b and to have a connection relation having a high power transmission loss.

The matching unit 15a matches a combination of the consumers A20 and B30 estimated by the connection relation estimating unit 14a to be connected to the common power distribution line system 54a.

More specifically, a side transmitting a superimposition signal and a side receiving the superimposition signal that has been transmitted are matched as a combination of consumers that can transmit and receive electric power.

In a case in which a superimposition signal transmitted from the consumer A20 is received by a plurality of consumers B30 and the like, the matching unit 15a determines a combination of consumers to be matched on the basis of the attenuation rate of the received superimposition signal for each consumer.

In other words, in a case in which there is a plurality of consumers that can receive a superimposition signal, such consumers are estimated to be connected to the same power distribution line system 54a or to be connected to different power distribution line systems having a very close relation.

In such a case, matching is performed with a consumer having a low attenuation rate of the superimposition signal prioritized among the plurality of consumers that can receive the superimposition signal.

In this way, among a plurality of consumers that can receive a superimposition signal, a consumer of a connection relation estimated to have the smallest power transmission loss can be selected and matched. Accordingly, for example, the surplus electric power generated by the consumer A20 can be supplied to the consumer B30 of a connection relation having a smallest power transmission loss.

As a result, surplus power generated within the consumer group 53a can be supplied to a consumer having the smallest power transmission loss, and accordingly, the surplus electric power can be effectively used.

In addition, a combination of consumers performed by the matching unit 15a, for example, may be performed with a consumer such as a family member, a friend, an acquaintance, a public organization, or the like prioritized instead of being performed on the basis of the attenuation rate of the superimposition signal described above.

The storage unit 16a stores information of a high frequency component and a system voltage used for the generation of a superimposition signal described above, the superimposition signal generated by the superimposition signal generating unit 11a, a transmission history of the transmission unit 12a, a receiving history of the receiving unit 13a, a result of the estimation made by the connection relation estimating unit 14a, a result of the combination made by the matching unit 15a, and the like.

<Power Coordination Control Method>

Figure 3:
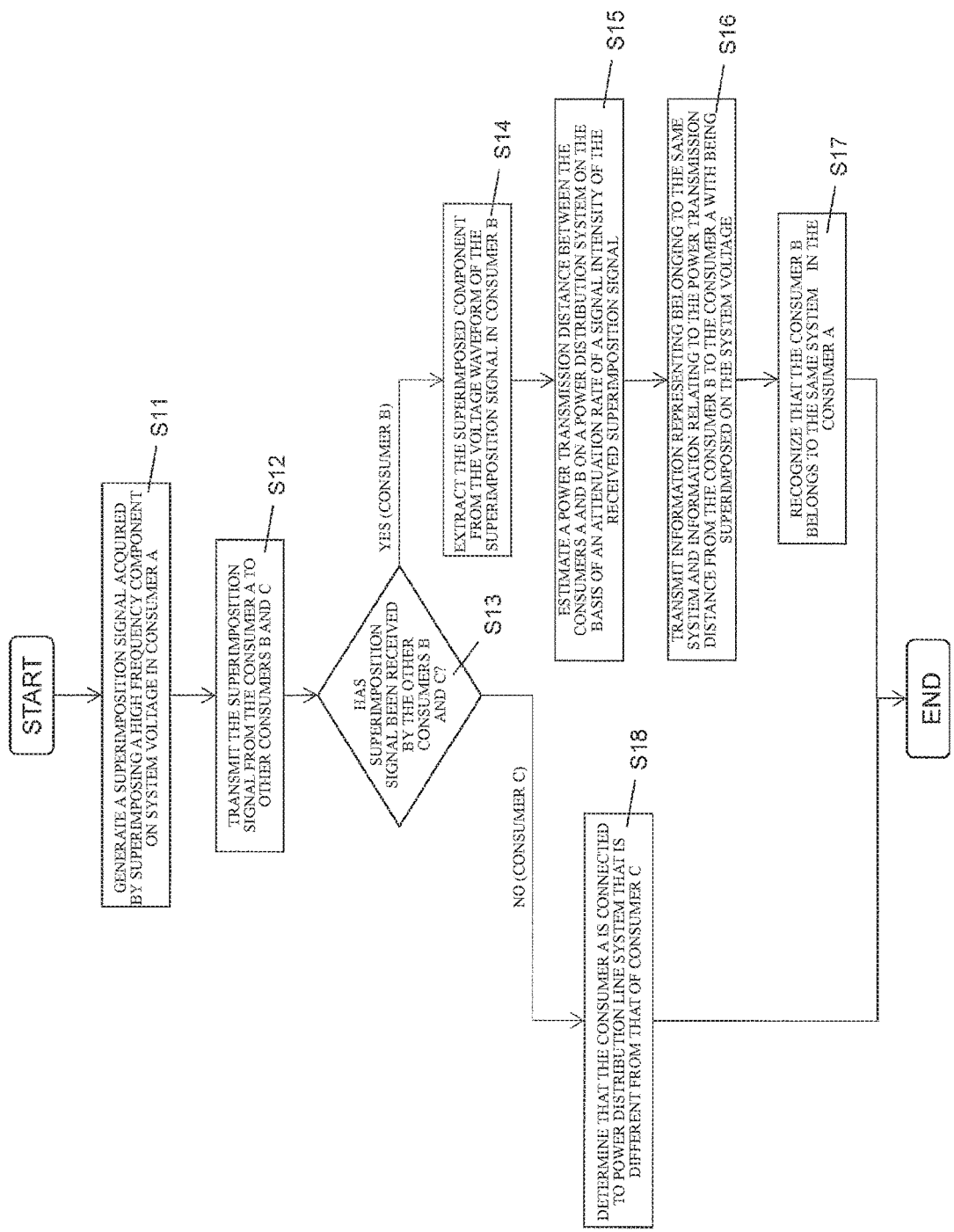
FIG. 3 is a flowchart illustrating the flow of a power coordination control method using the power coordination control system illustrated in FIG. 1.

The power coordination control systems 10a to 10c according to this embodiment, by employing the configuration described above, perform power coordination connection control in accordance with a flowchart illustrated in FIG. 3.

In Step S11, in the consumer A20, the superimposition signal generating unit 11a generates a superimposition signal acquired by superimposing a predetermined high frequency component on a voltage supplied from the system 50.

Figure 4:
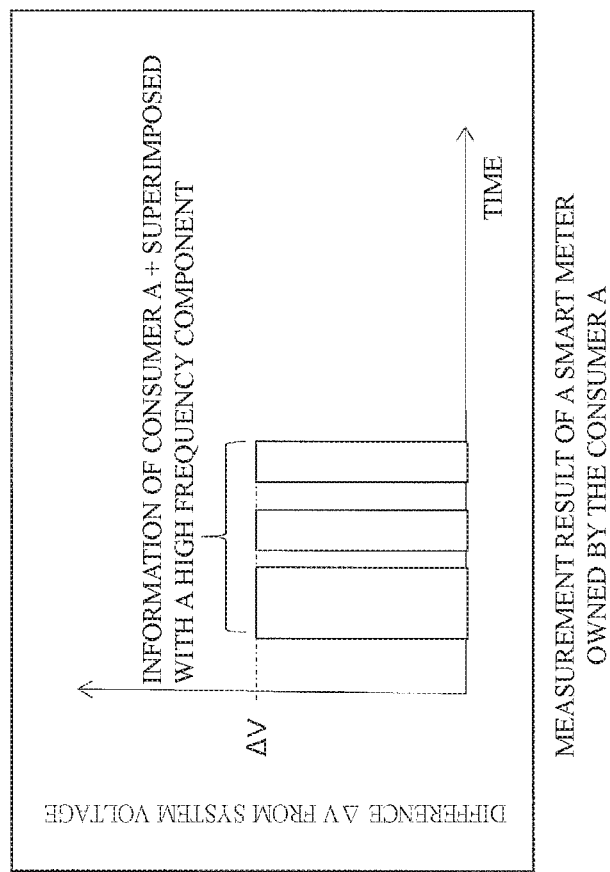
FIG. 4 is a diagram illustrating a signal intensity of a superimposition signal transmitted from a consumer A illustrated in FIG. 1.

Here, the superimposition signal generated by the superimposition signal generating unit 11a of the consumer A20, as illustrated in FIG. 4, is generated by superimposing a high frequency component on a system voltage in a state in which the positional information of the consumer A20 is assigned.

In addition, in this embodiment, although a superimposition signal to which the positional information of the consumer A20 is assigned is generated, in a case in which a positional relation with the consumer A20 can be recognized, for example, in accordance with the attenuation rate of the signal intensity or a delay time, an S/N ratio, or the like of the receiving signal, the positional information of the consumer A20 does not need to be attached.

In addition, the high frequency component to be superimposed on the system voltage illustrated in FIG. 4 is measured by the smart meter 27 owned by the consumer A20.

Next, in Step S12, the consumer A20 transmits the generated superimposition signal to the other consumers B30, C40, and the like by using the transmission unit 12a.

Next, in Step S13, the consumers B30 and C40 determine whether or not the receiving units 13b and 13c have received the superimposition signal transmitted from the transmission unit 12a of the consumer A20. Here, in a case in which the superimposition signal has been received, the process proceeds to Step S14. On the other hand, in a case in which the superimposition signal has not been received, the process proceeds to Step S18.

Here, the consumer B30 that has received the superimposition signal can recognize a connection to the power distribution line system 54a in common with the consumer A20 from the receiving of the superimposition signal and the positional information of the consumer A20 attached to the superimposition signal.

Nest, in Step S14, since the superimposition signal has been received by the receiving unit 13b of the consumer B30, the component superimposed on the system voltage is extracted from the received superimposition signal.

Here, the component $\Delta V'$ extracted from the superimposition signal received from the receiving unit 13b of the consumer B30, as illustrated in FIG. 5, is in a state in which the high frequency component (difference $\Delta V$) illustrated in FIG. 4 is attenuated ($\Delta V > \Delta V'$). As a cause of this attenuation, a loss occurring at the time of transmitting electric power between the consumer A20 and the consumer B30 may be considered.

In addition, the component extracted as a difference from the system voltage illustrated in FIG. 5 is measured by the smart meter 37 owned by the consumer B30.

Next, in Step S15, the attenuation rate of the received superimposition signal (a component extracted therefrom) is calculated, and a power transmission distance on a power distribution line between the consumer A20 and the consumer B30 is estimated on the basis of this attenuation rate.

Next, in Step S16, both of the information representing belonging to the common power distribution system line 54a and the information relating to the power transmission distance are transmitted from the transmission unit 12b of the consumer B30 to the receiving unit 13a of the consumer A20 on the basis of the receiving status of the superimposition signal with being superimposed on the system voltage.

Next, in Step S17, it can be recognized that the transmitted superimposition signal is received by the consumer B30 connected to the same power distribution line system 54a by using the signal transmitted from the consumer B30.

In this way, it can be estimated that the consumer A20 and the consumer B30 are consumers belonging to the consumer group 53a connected to the common power distribution line system 54a. Accordingly, in a case in which the surplus electric power is generated in the consumer A20 or the consumer B30, it can be mutually circulated between the consumers having a small power transmission loss.

On the other hand, in Step S18, as illustrated in FIG. 6, since the receiving unit 13c of the consumer C40 could not receive (extract) a component superimposed on the superimposition signal, the consumer C cannot respond to the consumer A by superimposing the received information on the system voltage.

A result of the measurement illustrated in FIG. 6 is acquired through the measurement performed by the smart meter 47 owned by the consumer C40.

Here, a case may be considered in which the consumer A20 that has transmitted the superimposition signal and the consumer C40 are connected to a different power distribution line system 54b because of not receiving the superimposition signal in the consumer C40. In other words, since the consumers A20 and C40 are connected to the different power distribution line systems 54a and 54b, the high frequency component superimposed in the superimposition signal is estimated to be attenuated and disappear due to an increase in the power transmission loss at the time of passing through a columnar transformer (not illustrated in the drawing) or the like.

In this way, the consumer A20 can recognize that the transmitted superimposition signal could not be received by the consumer C40.

Accordingly, in the consumer A20, even in a case in which surplus electric power is generated, if the surplus electric power is supplied to the consumer C40, the power transmission loss is large, and thus, it can be recognized that a part or the whole surplus electric power attenuates.

As a result, the consumer A20 compares the consumer B30 and the consumer C40, to which the superimposition signal has been transmitted, with each other and can configure the consumer B30 to which electric power can be efficiently transmitted as a supply destination or a supply source of the surplus electric power.

In addition, in the storage unit 16a disposed inside the smart meter 27 owned by the consumer A20, various kinds of information included in a reply to the superimposition signal received from the consumer B30 is stored.

<Matching Method>

Figure 7:
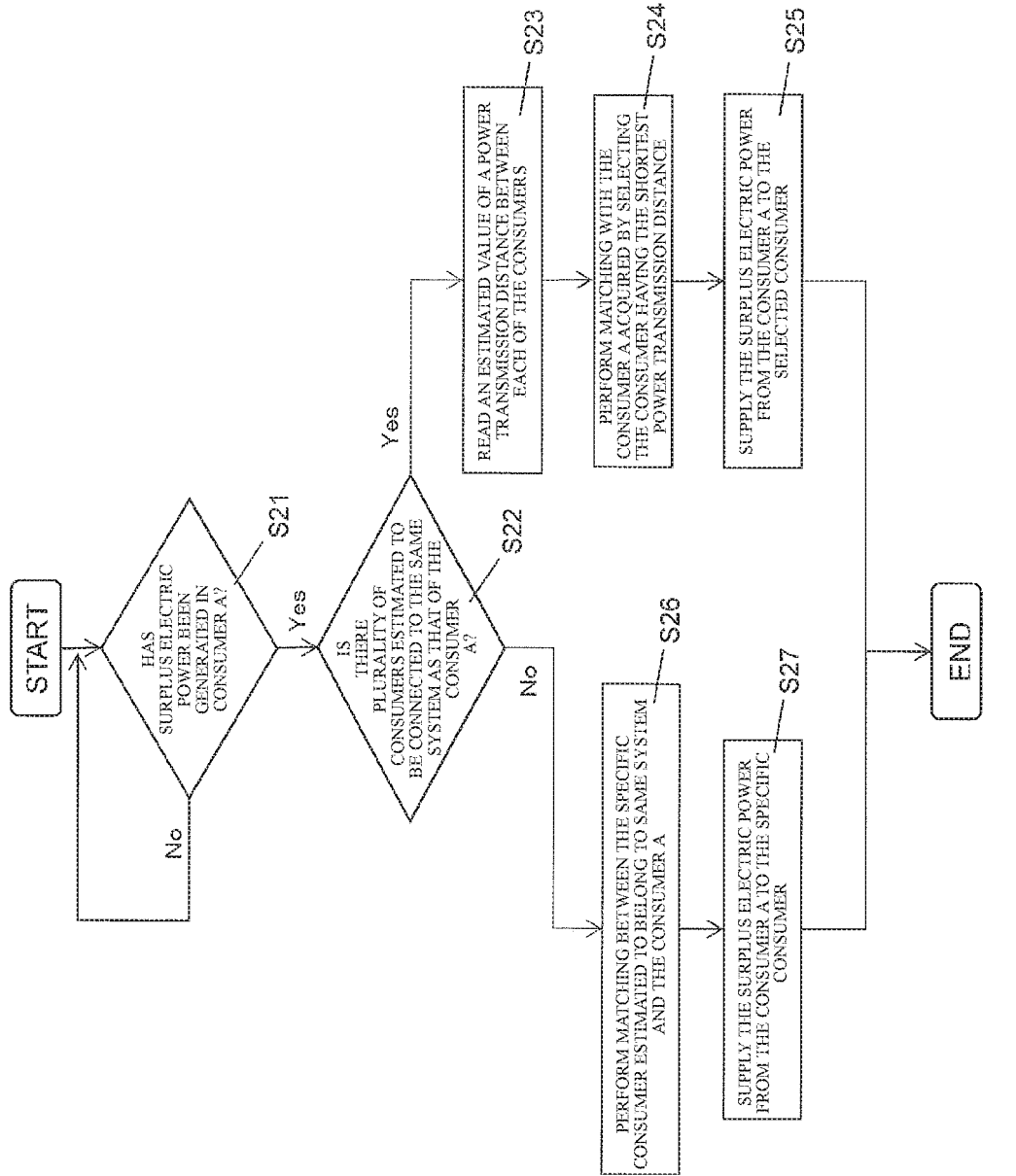
FIG. 7 is a flowchart illustrating a flow determining a combination of consumers circulating surplus electric power after estimation of a connection relation illustrated in FIG. 3.

The power coordination control systems 10a to 10c, according to this embodiment, employing the configuration as described above, may match a combination of consumers that are a supply source and a supply destination of the surplus electric power between the consumers A20 and B30 both of which the connection relation therebetween is estimated in accordance with the flowchart illustrated in FIG. 7.

In other words, in Step S21, it is determined whether or not the surplus electric power is generated by the consumer A20 that has received the reply of the superimposition signal from the consumer B30.

The presence or absence of the surplus electric power determined here may be determined in accordance with the power supply demand status at the current time point or may be determined as an estimated value in accordance with the power supply demand status inside the consumer A20 in a predetermined time period. Here, in a case that the surplus electric power is generated in the consumer A20, the process proceeds to Step S22.

The prediction of the amount of power supply in the future power supply and demand may be performed using data of hours of sunlight or the like of the weather forecast as power may be generated by using the solar panels 21 and 31 owned by the consumers A20, B30, and the like. In addition, the prediction of the amounts of power supply using the power storage devices 23 and 33 may be performed using the current amounts of power storage using the power storage devices 23 and 33.

On the other hand, the prediction of the amounts of power consumption in the future power supply and demand may be performed on the basis of data of life patterns or the like of the consumers A20 and B30.

Next, in Step S22, it is determined whether or not there is a plurality of consumers B30 and the like connected to the same power distribution line system 54a that is the same as that of the consumer A20.

Here, in a case in which it is determined that there exists the plurality of consumers, the process proceeds to Step S23. On the other hand, in a case in which it is determined that there is only the consumer B30, the process proceeds to Step S26.

Next, in Step S23, since there is a plurality of consumers B30 and the like connected to the same power distribution line system 54a as that of the consumer A20, the consumer A20 reads the contents of replies of the superimposition signal received from each of the plurality of the consumers B30 and the like from the storage unit 16a.

Next, in Step S24, a consumer having a low attenuation rate of the superimposition signal is selected from among the plurality of consumers and is matched as a supply destination of the surplus electric power generated in the consumer A20.

Next, in Step S25, in a predetermined time period in which surplus electric power is generated in the consumer A20, the surplus power is supplied to the consumer selected in Step S24.

On the other hand, in Step S26, since the consumer connected to the same power distribution line system 54a as that of the consumer A20 is only the consumer B30, this consumer B30 is matched with the consumer A20.

Next, in Step S27, in a predetermined time period in which surplus electric power is generated in the consumer A20, the surplus electric power is supplied to the consumer B30.

The power coordination control systems 10a to 10c according to this embodiment, estimate mutual connection relations of the consumers A20, B30, and C40 and match consumers mutually circulating surplus electric power in accordance with a result of the estimation as described above.

In this way, as a result of the estimation of the connection relation, for example, surplus electric power can be supplied to a consumer of a connection relation having a smallest power transmission loss. As a result, the surplus electric power generated in the consumer A20 can be supplied to the consumer B30 that can efficiently use the surplus electric power.

Other Embodiments

As above, while one embodiment of the present invention has been described, the present invention is not limited to the embodiment described above, and various changes can be made in a range not departing from the concept of the present invention.

(A)

In the embodiment described above, as a power coordination control method according to the present invention, while an example has been described in which the power coordination control is performed in accordance with the flowcharts illustrated in FIGS. 3 and 7. However, the present invention is not limited thereto.

For example, the present invention may be realized using the power coordination control method performed in accordance with the flowcharts illustrated in FIGS. 3 and 7 as a power coordination control program executed by a computer.

In addition, the present invention may be realized as a recording medium having this power coordination control program stored thereon.

(B)

In the embodiment described above, an example has been described in which the surplus electric power is circulated by combining one consumer B30 that belongs to the same consumer group 53a and is connected to the same power distribution line system 54a with one consumer A20. However, the present invention is not limited thereto.

For example, in a case in which the amount of surplus electric power generated by the consumer A20 is larger than the amount of required electric power of the consumer B30, a plurality of consumers B30 connected to the same power distribution line system may be combined with one consumer A20.

In such a case, the supply of surplus electric power can be performed from the consumer A20 in which the surplus electric power is generated in a large quantity to a plurality of consumers B30 having a small power transmission loss. Accordingly, more efficiently, the surplus electric power can be mutually circulated among the plurality of consumers.

(C)

In the embodiment described above, an example has been described in which surplus electric power is supplied from the consumer A20 generating a superimposition signal and transmitting the superimposition signal to the other consumers to the other consumers receiving the superimposition signals. However, the present invention is not limited thereto.

For example, a consumer on the side generating and transmitting a superimposition signal and a consumer that is the supply source of surplus electric power may not coincide with each other.

In other words, a consumer generating a superimposition signal and transmitting the superimposition signal to another consumer may be configured to request supply of surplus electric power from the another consumer.

(D)

In the embodiment described above, an example has been described in which a superimposition signal generated by the consumer A20 is transmitted to the consumer B30 and the consumer C40, and a connation relation is estimated in accordance with receiving statuses of the superimposition signal in the consumer B30 and the consumer C40. However, the present invention is not limited thereto.

For example, a superimposition signal generated by the consumer B30 or the consumer C40 may be transmitted to the other consumers A20 and C40 or the consumers A20 and B30, and a connection relation may be estimated in accordance with the receiving statuses of the superimposition signal in the consumers A20 and C40 or the consumers A20 and B30.

In other words, as illustrated in FIGS. 1 and 2, the consumers A20, B30, and C40 respectively include the superimposition signal generating units 11a to 11c, the transmission units 12a to 12c, the receiving units 13a to 13c, and the connection relation estimating units 14a to 14c.

For this reason, the generation of a superimposition signal may be generated by any one consumer, and the generated superimposition signal may be received by any consumer.

In addition, the estimation of the connection relation is not limited as being performed by a consumer that has received a superimposition signal, and the estimation may be performed by a consumer that is a transmission source as the information relating to the attenuation rate of the superimposition signal received from the consumer is replied to the consumer that is the transmission source.

(E)

In the embodiment described above, as illustrated in FIG. 1, an example has been described in which power generation devices such as the solar panels (photovoltaic power generation devices) 21, 31, and 41 and the power storage devices 23, 33, and 43 are used as power supply devices owned by a plurality of consumers A20, B30, and C40. However, the present invention is not limited thereto.

For example, as the power supply devices owned by a plurality of consumers, other power generation devices such as wind power generation devices or geothermal power generation devices may be used, and electric vehicles (batteries built therein), heat pumps, or the like may be used.

In addition, the power supply devices owned by consumers are not limited as being devices of a same kind but, power supply devices of different kinds may be owned.

(F)

In this embodiment, as illustrated in FIG. 2, an example has been illustrated in which the storage units 16a, 16b, and 16c storing various kinds of information are disposed inside the smart meters 27, 37, and 47 owned by the consumers A20, B30, and C40 configuring the power coordination control systems 10a to 10c. However, the present invention is not limited thereto.

For example, a server disposed outside the power coordination control systems, a cloud service, or the like may be used as the storage units storing various kinds of information.

(G)

In the embodiment described above, an example has been described in which, when superimposition signals are to be generated by the superimposition signal generating units 11a, 11b, and 11c, predetermined high frequency components are superimposed on the system voltage. However, the present invention is not limited thereto.

For example, a predetermined signal superimposed on the system voltage is not limited to a high frequency component, but any other signal may be used.

INDUSTRIAL APPLICABILITY

The power coordination control system according to the present invention has an effect of efficiently mutually circulating surplus electric power by searching for consumers connected to the same power distribution network among a plurality of consumers and accordingly, can be broadly applied to a system including a power distribution line system to which a plurality of consumers are connected.

The invention claimed is:

1. A power coordination control system used for retrieving a connection relation between a first consumer and a second consumer connected to a first power distribution line system, the power coordination control system comprising:
a superimposition signal generating unit that generates a superimposition signal acquired by superimposing a predetermined signal on a voltage supplied from the first power distribution line system in the first consumer;
a transmission unit that transmits the superimposition signal generated by the superimposition signal generating unit from the first consumer to the second consumer;
a receiving unit that receives the superimposition signal in the second consumer; and
a connection relation estimating unit that estimates a connection relation between the first consumer and the second consumer on the basis of at least one of a receiving status of the superimposition signal and receiving information received by the receiving unit.

2. The power coordination control system according to claim 1, wherein the connection relation estimating unit estimates that the first consumer and the second consumer are connected to the first power distribution line system in a case in which the superimposition signal is received.

3. The power coordination control system according to claim 2, wherein the connection relation estimating unit estimates a power transmission distance between the first consumer and the second consumer in accordance with at least one of an attenuation rate of a signal intensity of the superimposition signal compared to a predetermined signal intensity, a delay time of the signal, and an S/N ratio.

4. The power coordination control system according to claim 1, wherein the connection relation estimating unit estimates that the second consumer are connected to a second power distribution line system other than the first power distribution line system in a case in which the superimposition signal is not received.

5. The power coordination control system according to claim 1, wherein the superimposition signal generating unit generates the superimposition signal by superimposing a predetermined high frequency component on a voltage supplied from the first power distribution line system.

6. The power coordination control system according to claim 1, wherein the superimposition signal generating unit generates the superimposition signal to which at least one of positional information and identification information of the first consumer is assigned.

7. The power coordination control system according to claim 1, further comprising a matching unit that determines a supply destination of surplus electric power generated in the first consumer or the second consumer on the basis of a result of the estimation performed by the connection relation estimating unit in a case in which the superimposition signals transmitted from a plurality of the first consumers are received.

8. The power coordination control system according to claim 7, wherein the matching unit performs supply of surplus electric power by combining the first consumer and the second consumer having low attenuation rates of the signal intensities of the superimposition signals, short delay times of the signals, or high S/N ratios according to a result of the estimation performed by the connection relation estimating unit.

9. A power coordination control method used for retrieving a connection relation between a first consumer and a second consumer connected to a first power distribution line system, the power coordination control method comprising:
a superimposition signal generating step of generating a superimposition signal acquired by superimposing a predetermined signal on a voltage supplied from the first power distribution line system in the first consumer;
a transmission step of transmitting the superimposition signal generated in the superimposition signal generating step from the first consumer to the second consumer;
a receiving step of receiving the superimposition signal in the second consumer; and
a connection relation estimating step of estimating a connection relation between the first consumer and the second consumer on the basis of at least one of a status of the superimposition signal received in the receiving step and receiving information received in the receiving step.

10. A non-transitory storage medium for storing a power coordination control program used for retrieving a connection relation between a first consumer and a second consumer connected to a first power distribution line system, wherein the power coordination control program causing a computer to execute a power coordination control method comprising:

a superimposition signal generating step of generating a superimposition signal acquired by superimposing a predetermined signal on a voltage supplied from the first power distribution line system in the first consumer;

a transmission step of transmitting the superimposition signal generated in the superimposition signal generating step from the first consumer to the second consumer;

a receiving step of receiving the superimposition signal in the second consumer; and a connection relation estimating step of estimating a connection relation between the first consumer and the second consumer on the basis of at least one of a status of the superimposition signal received in the receiving step and receiving information received in the receiving step.

11. The power coordination control system according to claim 2, wherein the superimposition signal generating unit generates the superimposition signal by superimposing a predetermined high frequency component on a voltage supplied from the first power distribution line system.

12. The power coordination control system according to claim 3, wherein the superimposition signal generating unit generates the superimposition signal by superimposing a predetermined high frequency component on a voltage supplied from the first power distribution line system.

13. The power coordination control system according to claim 2, wherein the superimposition signal generating unit generates the superimposition signal to which at least one of positional information and identification information of the first consumer is assigned.

14. The power coordination control system according to claim 3, wherein the superimposition signal generating unit generates the superimposition signal to which at least one of positional information and identification information of the first consumer is assigned.

15. The power coordination control system according to claim 5, wherein the superimposition signal generating unit generates the superimposition signal to which at least one of positional information and identification information of the first consumer is assigned.

16. The power coordination control system according to claim 2, further comprising a matching unit that determines a supply destination of surplus electric power generated in the first consumer or the second consumer on the basis of a result of the estimation performed by the connection relation estimating unit in a case in which the superimposition signals transmitted from a plurality of the first consumers are received.

17. The power coordination control system according to claim 3, further comprising a matching unit that determines a supply destination of surplus electric power generated in the first consumer or the second consumer on the basis of a result of the estimation performed by the connection relation estimating unit in a case in which the superimposition signals transmitted from a plurality of the first consumers are received.

18. The power coordination control system according to claim 4, further comprising a matching unit that determines a supply destination of surplus electric power generated in the first consumer or the second consumer on the basis of a result of the estimation performed by the connection relation estimating unit in a case in which the superimposition signals transmitted from a plurality of the first consumers are received.

19. The power coordination control system according to claim 5, further comprising a matching unit that determines a supply destination of surplus electric power generated in the first consumer or the second consumer on the basis of a result of the estimation performed by the connection relation estimating unit in a case in which the superimposition signals transmitted from a plurality of the first consumers are received.

20. The power coordination control system according to claim 6, further comprising a matching unit that determines a supply destination of surplus electric power generated in the first consumer or the second consumer on the basis of a result of the estimation performed by the connection relation estimating unit in a case in which the superimposition signals transmitted from a plurality of the first consumers are received.

* * * * *